United States Patent
Cho et al.

(10) Patent No.: US 11,693,173 B2
(45) Date of Patent: Jul. 4, 2023

(54) OPTICAL COMPOSITE SHEET AND DISPLAY DEVICE COMPRISING SAME

(71) Applicant: SK MICROWORKS SOLUTIONS CO., LTD., Cheonan-si (KR)

(72) Inventors: Kyoo Choong Cho, Seoul (KR); Tae Hoon Kim, Yongin-si (KR); Yong Jae Choe, Osan-si (KR); Jae Ho Ko, Osan-si (KR)

(73) Assignee: SK MICROWORKS SOLUTIONS CO., LTD., Cheonan-si (KR)

( * ) Notice: Subject to any disclaimer, the term of this patent is extended or adjusted under 35 U.S.C. 154(b) by 83 days.

(21) Appl. No.: 17/383,014

(22) Filed: Jul. 22, 2021

(65) Prior Publication Data
US 2022/0057566 A1 Feb. 24, 2022

(30) Foreign Application Priority Data
Aug. 20, 2020 (KR) .................. 10-2020-0104514

(51) Int. Cl.
*F21V 8/00* (2006.01)
(52) U.S. Cl.
CPC ......... *G02B 6/0053* (2013.01); *G02B 6/0051* (2013.01)
(58) Field of Classification Search
CPC ............... G02B 6/0053; G02B 6/0051; G02F 1/133607; G02F 1/133606; G02F 1/133536; G02F 2201/08; G02F 2201/086
See application file for complete search history.

(56) References Cited

U.S. PATENT DOCUMENTS

| | | | |
|---|---|---|---|
| 2005/0046321 | A1 | 3/2005 | Suga et al. |
| 2017/0205664 | A1 | 7/2017 | Cho et al. |
| 2017/0285248 | A1 | 10/2017 | Cho et al. |
| 2018/0120492 | A1 | 5/2018 | Lee et al. |
| 2019/0049790 | A1 | 2/2019 | Okabe et al. |
| 2019/0113664 | A1 | 4/2019 | Yoshikawa et al. |

FOREIGN PATENT DOCUMENTS

| | | |
|---|---|---|
| JP | 2010-134349 A | 6/2010 |
| JP | 2017-129849 A | 7/2017 |
| KR | 10-2012-0072194 A | 7/2012 |
| WO | 2010/029910 A1 | 3/2010 |

*Primary Examiner* — Andrew J Coughlin
*Assistant Examiner* — Jessica M Apenteng
(74) *Attorney, Agent, or Firm* — Sughrue Mion, PLLC

(57) ABSTRACT

An optical composite sheet is disclosed. In the optical composite sheet, optical functional elements such as a prism sheet and a light diffusion layer are combined, and a light absorbing layer that selectively absorbs light of a specific wavelength band is inserted, so that the optical performance and color gamut can be enhanced as compared with the prior art. In particular, the color transmittance of the optical composite sheet with respect to wavelength measured for each viewing angle satisfies a specific relationship, whereby it is possible to effectively reduce the color deviation with respect to the viewing angle.

10 Claims, 9 Drawing Sheets

[Fig. 1]
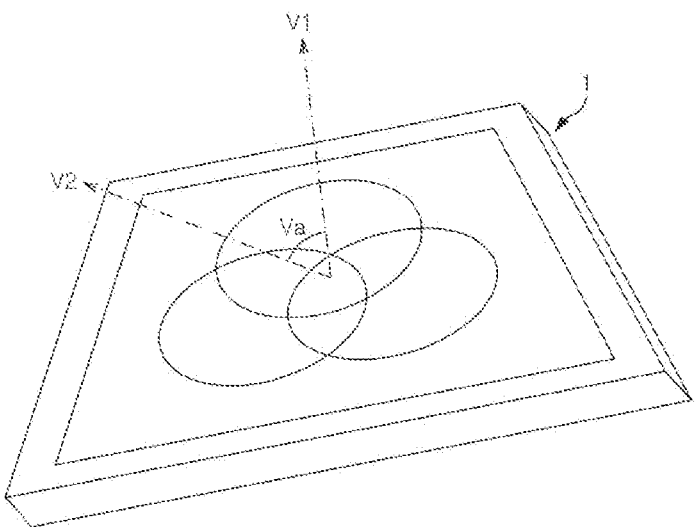
[Fig. 2]
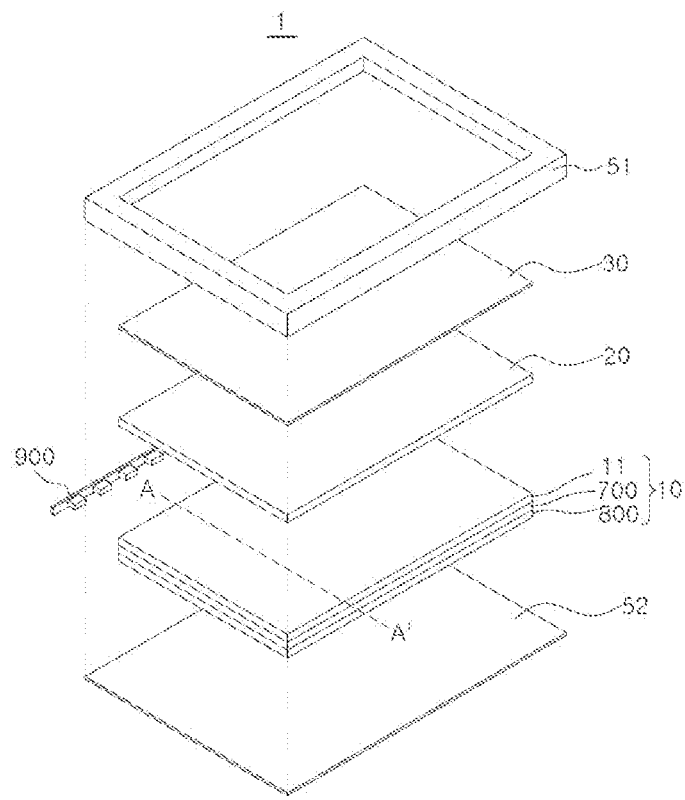

[Fig. 3]
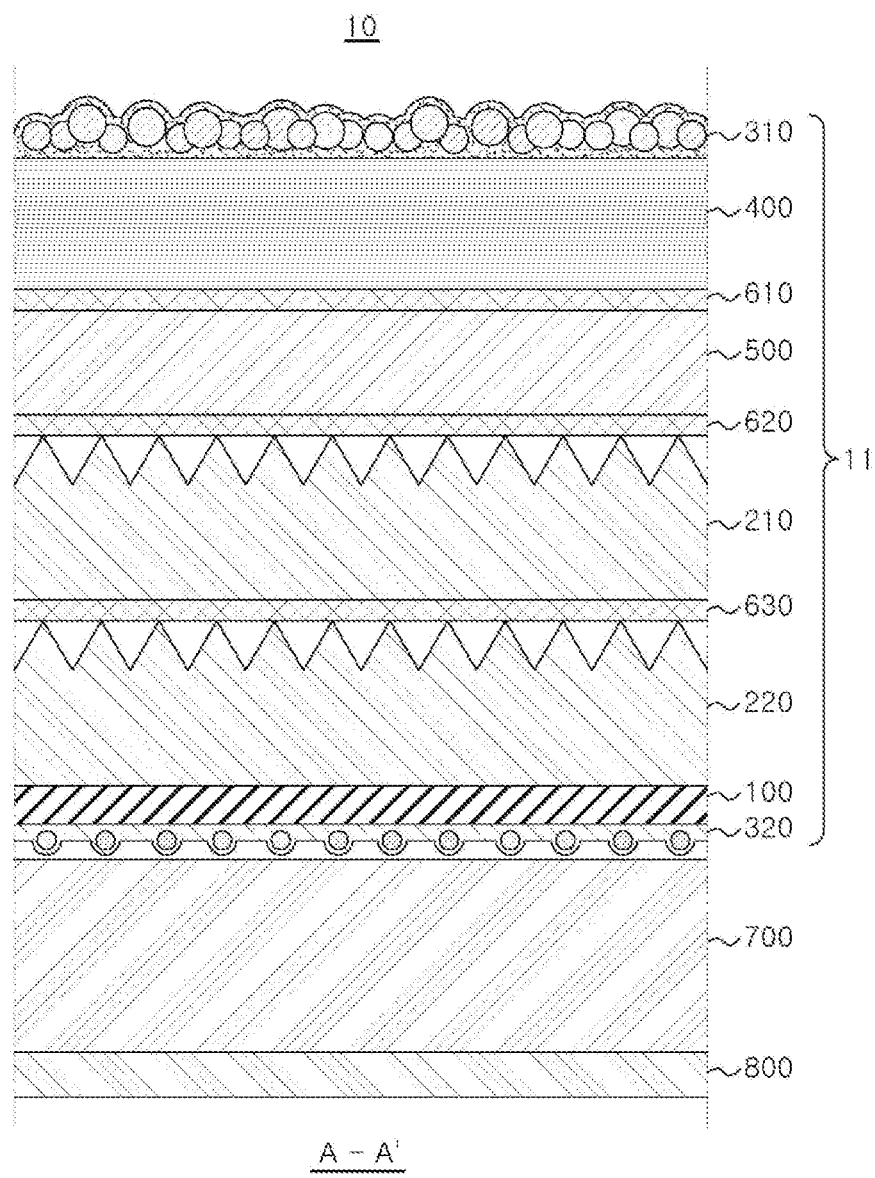
A - A'

[Fig. 4a]
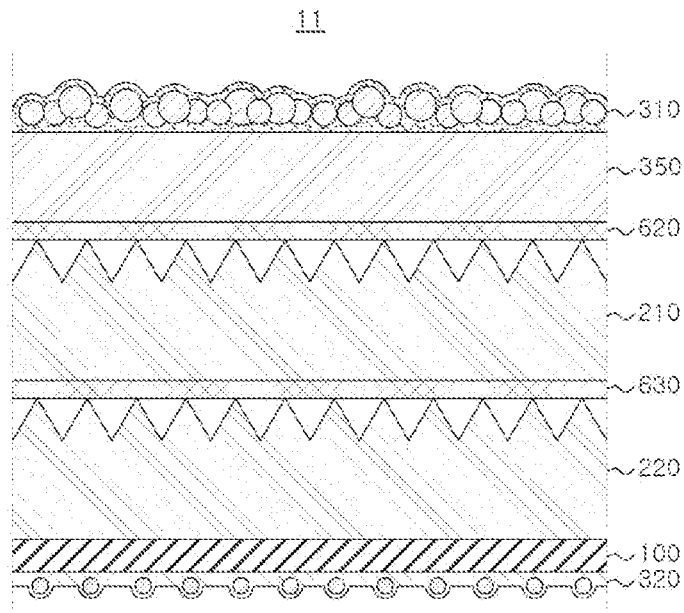
[Fig. 4b]
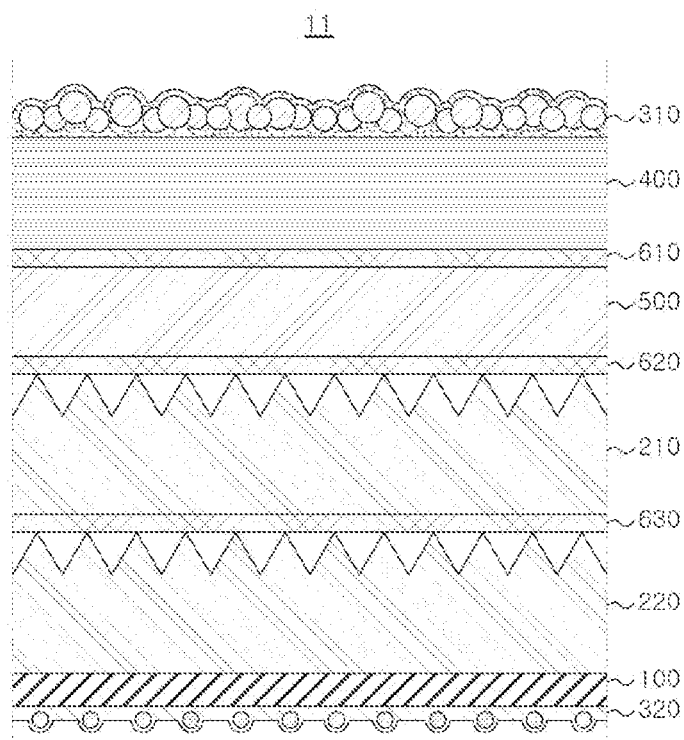

[Fig. 5a]
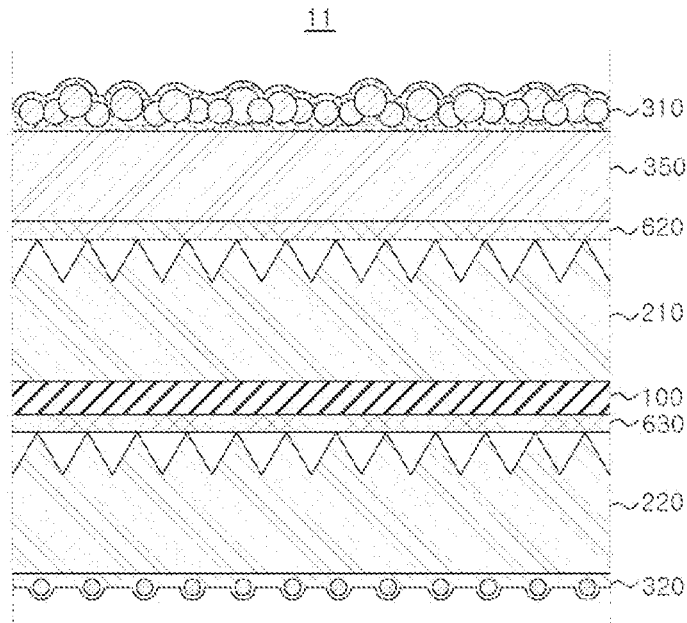
[Fig. 5b]
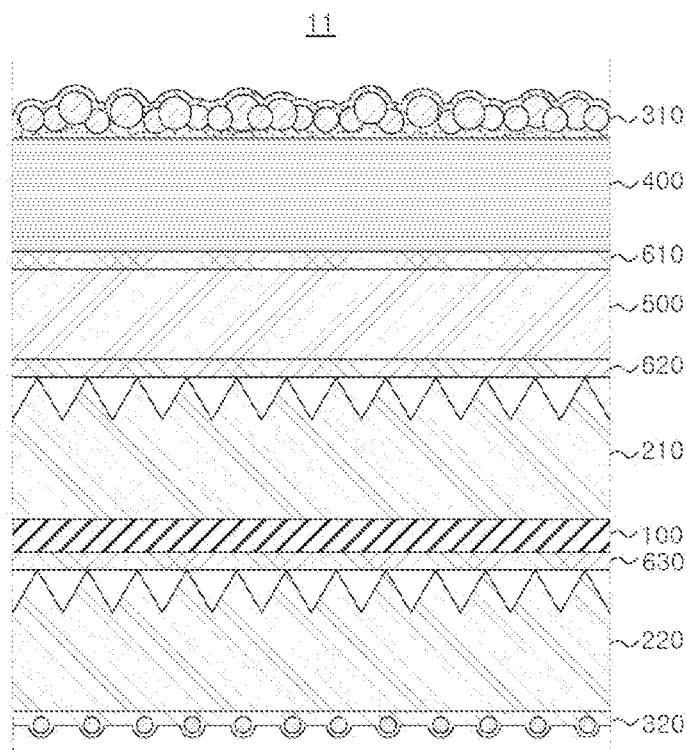

[Fig. 6a]
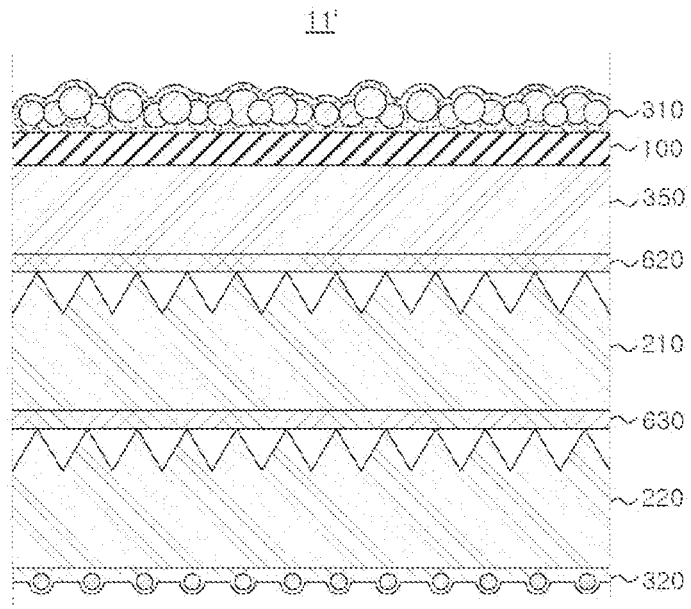
[Fig. 6b]
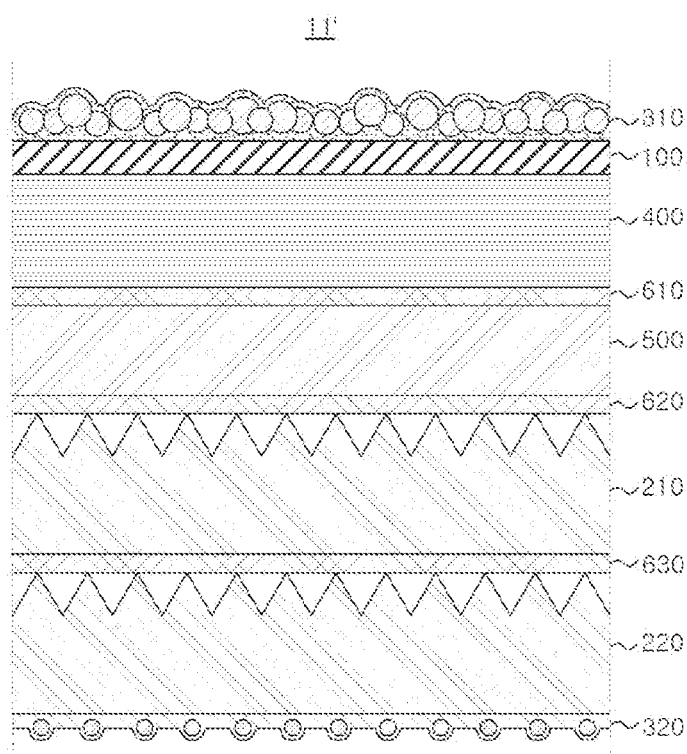

[Fig. 7a]
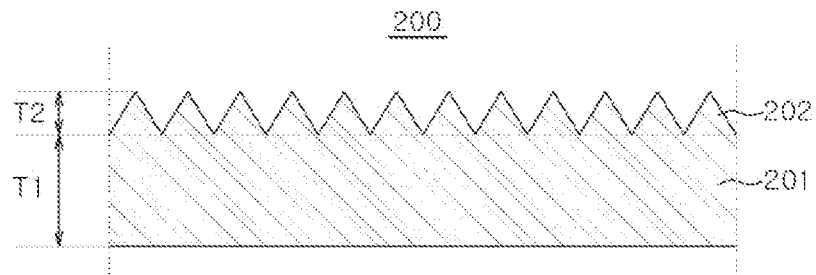
[Fig. 7b]
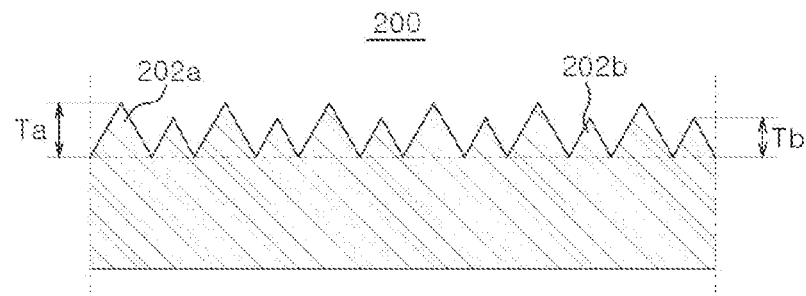
[Fig. 7c]
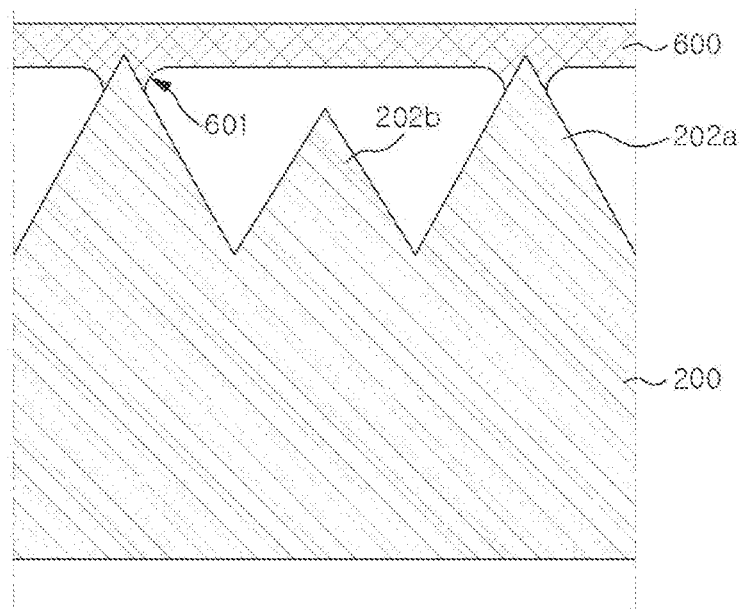

[Fig. 8]
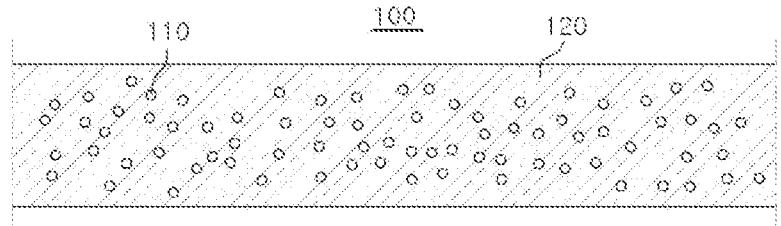
[Fig. 9a]
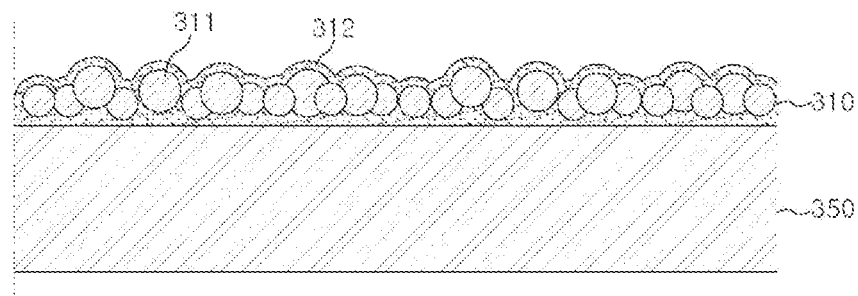
[Fig. 9b]
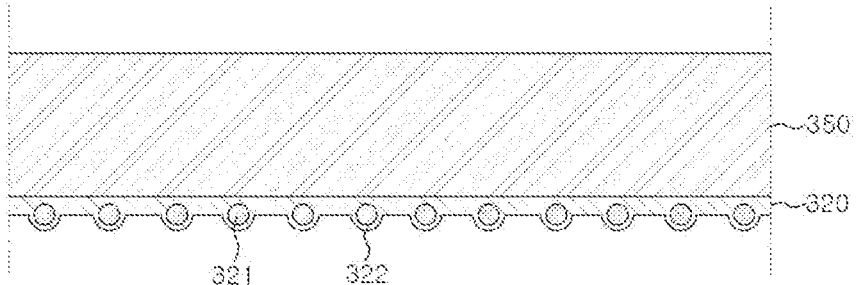
[Fig. 10]
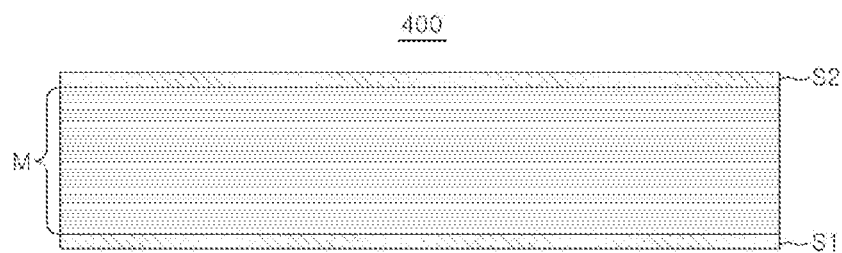

[Fig. 11a]
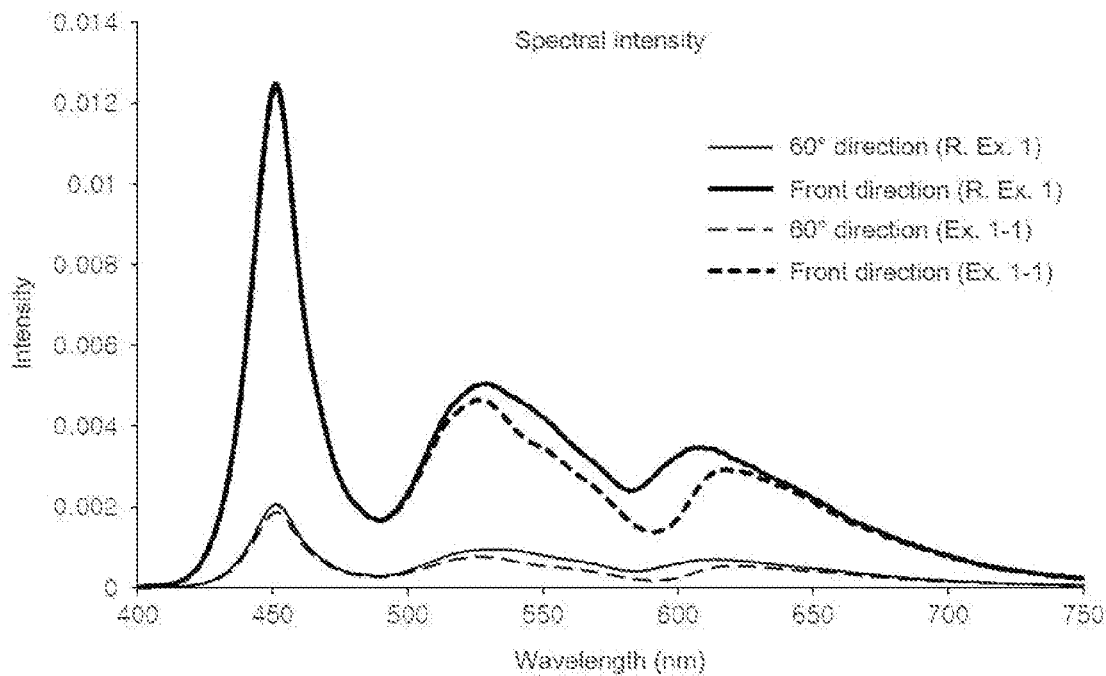
[Fig. 11b]
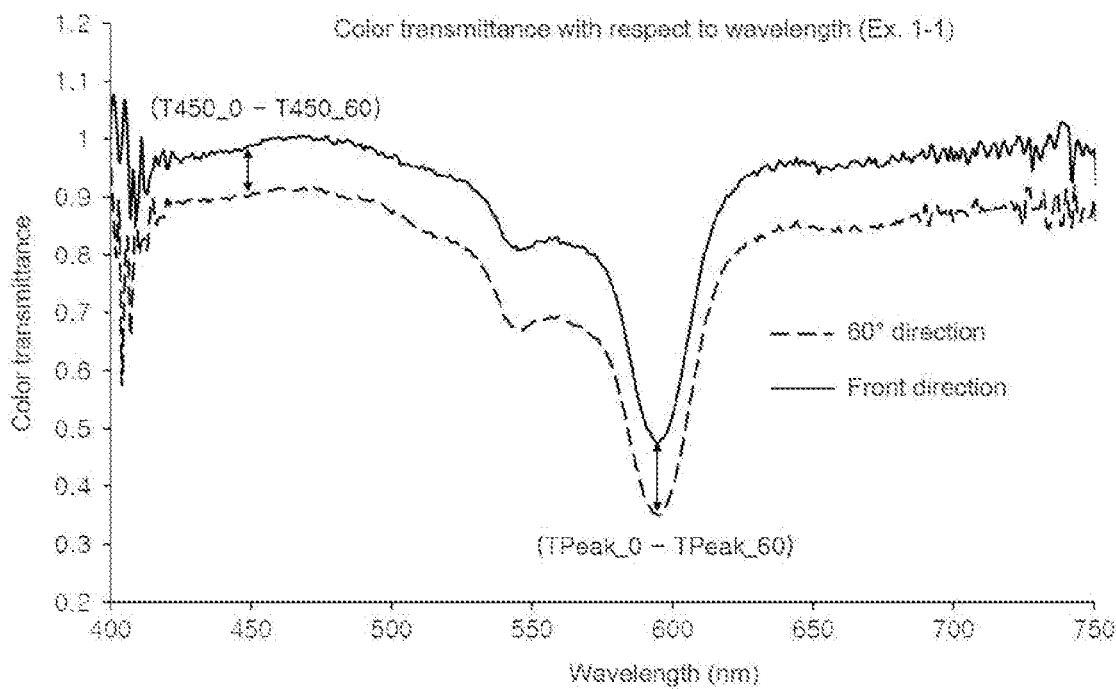

[Fig. 12a]
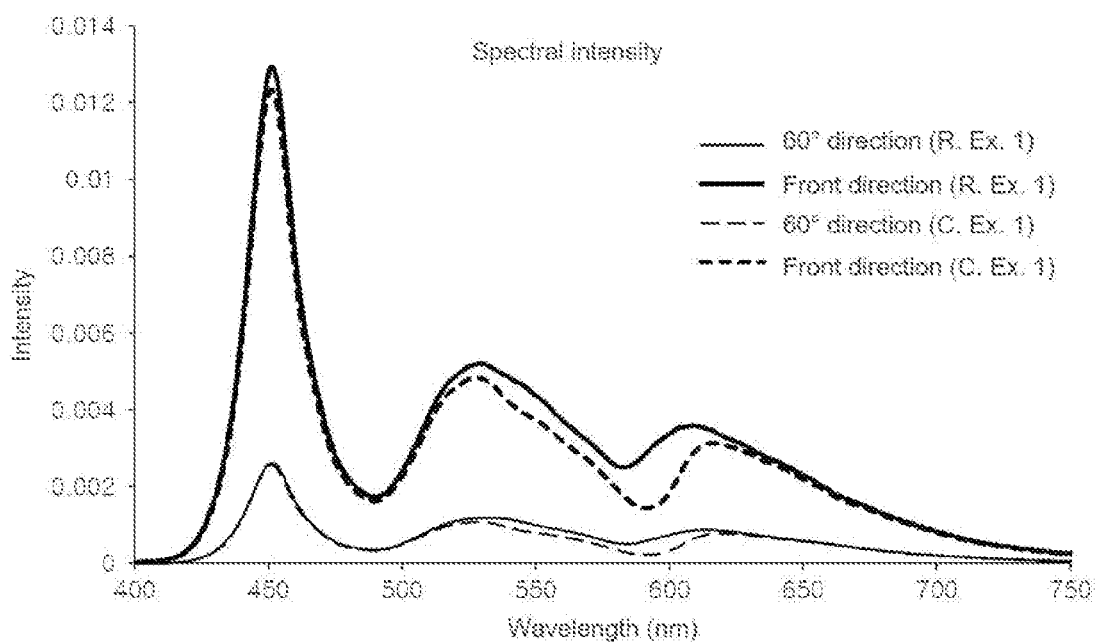
[Fig. 12b]
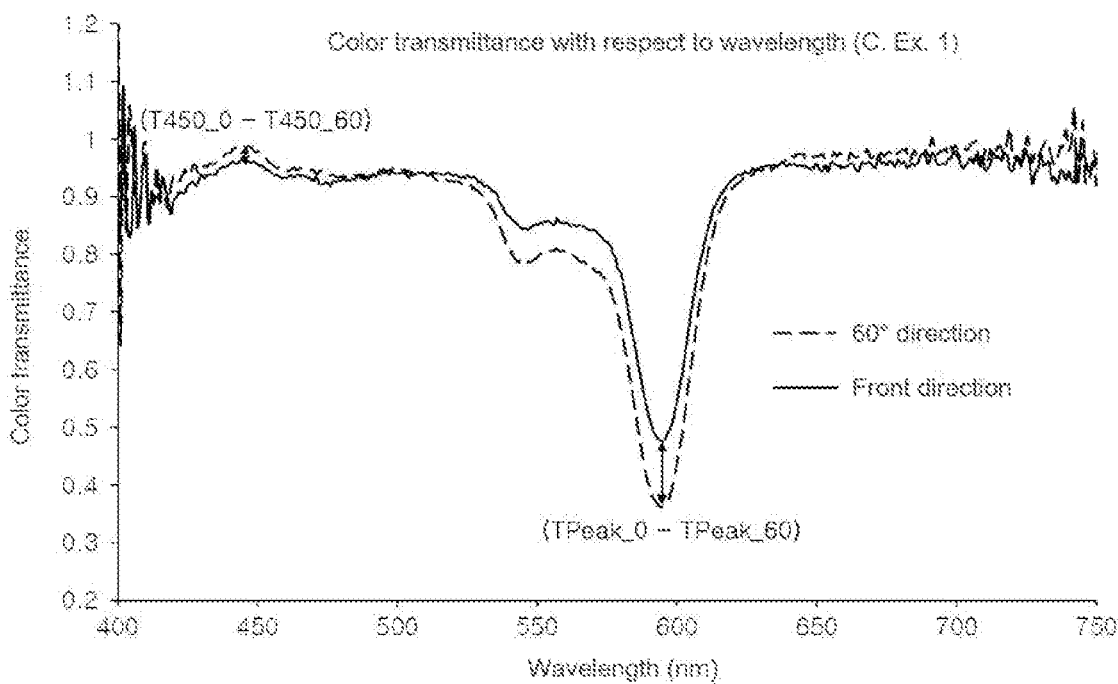

OPTICAL COMPOSITE SHEET AND DISPLAY DEVICE COMPRISING SAME

CROSS REFERENCE TO RELATED APPLICATIONS

This application claims priority and benefits from Korean Patent Application No. 10-2020-0104514 filed Aug. 20, 2020, of which the content is incorporated herein by reference in its entirety.

TECHNICAL FIELD

Embodiments relate to an optical sheet capable of reducing color deviation according to the viewing angle and to a display device comprising the same.

BACKGROUND ART

In the past, 40-inch (") TVs were the mainstream, but now a lot of consumers would buy 50" TVs and even 60" TVs. As such size competition has ended, the resolution competition has begun. A year ago, full high definition (FHD) TVs were a high-end model, but now ultra high definition (UHD) TVs have spread rapidly in the market.

Recently, the field of display devices is evolving from competition in the increased area and high resolution to competition in color. For this reason, competition for manufacturing a display device having excellent color has recently emerged.

A liquid crystal display (LCD) displays an image by using the optical properties of liquid crystal. Since a liquid crystal display panel that displays the image is a non-light-emitting device that does not emit light by itself, it has a structure comprising a liquid crystal display panel and a back-light unit that is disposed on the rear side thereof and supplies light to the liquid crystal display panel. A liquid crystal display device has advantages in that it is thinner and lighter in weight, consumes a low power, and requires a low driving voltage as compared with other display devices, whereas it is somewhat inferior to other display devices from the viewpoint of color.

In addition, cathode ray tube (CRT) display devices, which are disappearing now, have a color gamut of up to 80% based on the National Television Standards Committee (NTSC), and plasma display panel (PDP) devices having an NTSC level of 90% also have been marketed until recently. In addition, organic light-emitting display (OLED) devices, which are in the spotlight as a next-generation display device, can achieve an NTSC level of up to 100%. However, LCD TVs have an NTSC level of 72%.

Accordingly, in order to promote the market of the display device field, there has been a demand for a technology to enhance the color gamut and to reduce the color deviation according to the viewing angle.

REFERENCE DOCUMENT (Patent Document 1) Korean Laid-open Patent Publication No. 2012-0072194

DISCLOSURE

Technical Problem

An optical sheet adopted in the backlight unit of a display device performs such functions as collecting, diffusing, and reflecting light. When two or more functions are combined, individual optical functions can be complemented and maximized. In addition, a filter function that blocks unnecessary wavelengths other than RGB may be combined with an optical sheet to enhance the color gamut.

As a result of research conducted by the present inventors, an optical composite sheet having enhanced optical performance and color gamut as compared with the prior art has been developed by way of inserting a light absorbing layer for selectively absorbing light of a specific wavelength band while optical functional elements such as a prism sheet and a light diffusion layer are combined. In particular, the present inventors have established an equation that the color transmittance with respect to wavelength for each measurement angle must satisfy, whereby it is possible to effectively reduce the color deviation with respect to the viewing angle.

Accordingly, an object of the embodiments is to provide an optical composite sheet capable of reducing a color deviation with respect to a viewing angle and enhancing the color gamut and to provide a display device comprising the same.

Solution to Problem

According to an embodiment, there is provided an optical composite sheet, which comprises a prism sheet; a light diffusion layer disposed under the prism sheet; and a light absorbing layer disposed on the prism sheet, between the prism sheet and the light diffusion layer, or under the light diffusion layer, wherein the following Relationship (1) is satisfied:

$$0.5 \leq (T\text{Peak}\_0 - T\text{Peak}\_60)/(T450\_0 - T450\_60) \leq 1.5 \quad (1)$$

In Relationship (1), the front absorption peak (TPeak_0) is the lowest value among color transmittances measured in a direction perpendicular to the plane direction of the prism sheet, the lateral absorption peak (TPeak_60) is the lowest value among color transmittances measured in the direction at an angle of 60° to the perpendicular direction, the front blue transmittance (T450_0) is the color transmittance at a wavelength of 450 nm measured in the perpendicular direction, and the lateral blue transmittance (T450_60) is the color transmittance at a wavelength of 450 nm measured in the 60° direction In order to measure the color transmittance, a light source that emits white light with a continuous emission spectrum is prepared, a spectral intensity (L1) of light from the optical composite sheet is measured when light from the light source passes through the optical composite sheet, a reference sheet is prepared by removing the light absorbing layer from the optical composite sheet, a spectral intensity (L0) of light from the optical composite sheet is measured when light from the light source passes through the reference sheet, and the color transmittance is a value obtained by dividing L1 by L0.

According to another embodiment, there is provided a display device, which comprises a light source; an optical composite sheet into which light from the light source is incident; and a display panel into which light from the optical composite sheet is incident, wherein the optical composite sheet comprises a prism sheet; a light diffusion layer disposed under the prism sheet; and a light absorbing layer disposed on the prism sheet, between the prism sheet and the light diffusion layer, or under the light diffusion layer, and the above Relationship (1) is satisfied.

Advantageous Effects

According to the embodiment, it is possible to provide an optical composite sheet having enhanced optical performance and color gamut as compared with the prior art by way of inserting a light absorbing layer for selectively absorbing light of a specific wavelength band while optical functional elements such as a prism sheet and a light diffusion layer are combined. In particular, the color transmittance of the optical composite sheet with respect to wavelength measured for each viewing angle satisfies a specific relationship, whereby it is possible to effectively reduce the color deviation with respect to the viewing angle.

Accordingly, the optical composite sheet according to the embodiment may be applied to a backlight unit of a display device such as an LCD to enhance its performance.

BRIEF DESCRIPTION OF DRAWINGS

FIG. 1 shows a display device according to an embodiment and an angle of viewing a screen thereof.

FIG. 2 shows an exploded perspective view of a display device according to an embodiment.

FIG. 3 shows a cross-sectional view of a backlight unit according to an embodiment.

FIGS. 4a and 4b show cross-sectional views of the optical composite sheets of Examples 1-1 and 2-1, respectively.

FIGS. 5a and 5b show cross-sectional views of the optical composite sheets of Examples 1-2 and 2-2, respectively.

FIGS. 6a and 6b show cross-sectional views of the optical composite sheets of Comparative Examples 1 and 2, respectively.

FIGS. 7a to 7c are cross-sectional views of a prism sheet employed in an optical composite sheet according to an embodiment, respectively.

FIG. 8 is a cross-sectional view of a light absorbing layer employed in an optical composite sheet according to an embodiment.

FIGS. 9a and 9b are cross-sectional views of a first light diffusion layer and a second light diffusion layer employed in an optical composite sheet according to an embodiment, respectively.

FIG. 10 is a cross-sectional view of a reflective polarizing film employed in an optical composite sheet according to an embodiment.

FIGS. 11a and 11b show the spectral intensity and color transmittance of the optical composite sheet of Example 1-1, respectively.

FIGS. 12a and 12b show the spectral intensity and color transmittance of the optical composite sheet of Comparative Example 1, respectively.

EXPLANATION OF REFERENCE NUMERALS

1: display device
10: backlight unit
11: optical composite sheet (Example)
11': optical composite sheet (Comparative Example)
20: display panel
30: cover window
51: upper frame
52: lower frame
100: light absorbing layer
110: light absorber
120: binder resin
200: prism sheet
201: base layer
202: pattern layer
202a: first pattern
202b: second pattern
210: first prism sheet
220: second prism sheet
310: first light diffusion layer
311: bead
312: binder resin
320: second light diffusion layer
321: bead
322: binder resin
350: base film
400: reflective polarizing film
500: cushioning film
600, 610, 620, 630: adhesive layer
601: meniscus
700: light guide plate
800: reflector
M: laminate
S1, S2: skin layer
T1: thickness of a base layer
T2: thickness of a pattern layer
Ta: height of a first pattern
Tb: height of a second pattern
Va: difference in observation angle
V1: front direction
V2: lateral direction

BEST MODE

In the following description of the embodiments, in the case where an element is mentioned to be formed "on" or "under" another element, it means not only that one element is directly formed "on" or "under" another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted, and they may differ from the actual sizes.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

In the present specification, a singular expression is understood to encompass a singular or plural expression, interpreted in context, unless otherwise specified.

Display Device

The display device according to an embodiment comprises a light source, a display panel, and an optical composite sheet. The display panel receives light incident from the light source and displays an image. The optical composite sheet may be disposed in an optical path from the light source to the display panel. Thus, the display device may comprise a light source; an optical composite sheet on which light from the light source is incident; and a display panel on which light from the optical composite sheet is incident. As light from the light source passes through the optical composite sheet, its characteristics are enhanced, and the display panel displays an image using the light having the enhanced characteristics.

Specifically, referring to FIG. 2, the display device (1) may comprise a back-light unit (10); and a display panel (20) disposed on the backlight unit (10). The back-light unit (10) may comprise an optical composite sheet (11); and a diffusion plate or a light guide plate (700), and it may further comprise a light source (900).

The light source may be disposed on a lateral of the light guide plate or under the diffusion plate. The diffusion plate or light guide plate (700) is disposed under the optical composite sheet (11) and serves to transmit light generated from the light source (900) to the display panel (20). The light guide plate (700) is used in the case of an edge-type light source in which case a reflector (800) may be disposed under the light guide plate (700) to reduce light loss. The diffusion plate is used in the case of a direct light source, and an LED surface light source may be used to enhance light efficiency.

Referring to FIG. 2, light generated from the light source (900) is incident on a lateral of the light guide plate (700) and is reflected by the reflector (800) to enter the bottom of the optical composite sheet (11). The light incident in such a way passes through the optical composite sheet (11) vertically and is emitted from the top thereof. The light emitted from the top of the optical composite sheet (11) is incident on the display panel (20). As a result, an image may be displayed on the screen of the display panel.

The light source may be a white light source. For example, the light source may have a continuous emission spectrum. Specifically, the light source may be a white LED. More specifically, the light source may comprise a blue gallium nitride (GaN) light-emitting chip and a yellow yttrium aluminum garnet (YAG, $Y_3Al_5O_{12}$) phosphor. In addition, the light source may comprise a blue gallium nitride (GaN) light-emitting chip and an r, g phosphor or may comprise an r phosphor and a red KSF ($K_2SiF_6$:Mn) phosphor.

The display panel (20) may comprise a liquid crystal cell and one or more polarizing plates. As a specific example, the display panel (20) may have a structure in which a first polarizing plate, a liquid crystal cell, and a second polarizing plate are laminated in which an adhesive layer may be formed between the polarizing plates and the liquid crystal cell.

The display device (1) may further comprise a cover window (30) disposed on the display panel (20), and the cover window may be formed of a transparent polyimide film or ultra-thin glass (UTG). In addition, the display device (1) may further comprise an electrode and a substrate connected to the display panel (20). In addition, the display device (1) may comprise frames (51, 52) surrounding and protecting these components.

Constitutional Layers of the Optical Composite Sheet

The optical composite sheet comprises a prism sheet, a light diffusion layer, and a light absorbing layer. In addition, it may further comprise a base film, a reflective polarizing film, a cushioning film, and an adhesive layer.

The optical composite sheet may comprise a prism sheet; a light diffusion layer disposed under the prism sheet; and a light absorbing layer disposed on the prism sheet, between the prism sheet and the light diffusion layer, or under the light diffusion layer.

The prism sheet, the light diffusion layer, and the light absorbing layer may be disposed in an optical path from the light source to the display panel. The prism sheet, the light diffusion layer, and the light absorbing layer may be combined with each other. The light absorbing layer may be disposed closer to the light source than the prism sheet based on the light path. In addition, the light diffusion layer may be disposed closer to the light source than the light absorbing layer based on the light path.

Hereinafter, each constitutional layer will be described in detail.

Prism Sheet

The prism sheet serves to enhance luminance through collecting light by virtue of a difference in refractive index at the interface of the prism pattern.

Referring to FIG. 7a, the prism sheet (200) comprises a base layer (201) and a pattern layer (202) formed on the base layer. The pattern shape of the pattern layer is not particularly limited. For example, it may have a long triangular pillar shape, thereby refracting light at the interface.

The prism sheet may comprise a plurality of prism patterns having different heights from each other. Referring to FIG. 7b, the prism pattern may be composed of a first pattern (202a) and a second pattern (202b) having different heights from each other. The ratio (Tb/Ta) of the height (Tb) of the second pattern to the height (Ta) of the first pattern may be 0.5 to 0.99 or 0.8 to 0.95.

Referring to FIG. 7c, the vertex at the top end of the first pattern (202a) penetrates into an adhesive layer (600) and adheres thereto. In such a case, a meniscus (601) is formed, thereby deteriorating the light collecting performance. Thus, the height of the second pattern (202b) is made to differ from that of the first pattern to preserve the shape of the top end, whereby it is possible to suppress a deterioration in the light collecting performance.

The base layer and the pattern layer may be formed of the same material as each other. For example, the base layer and the pattern layer may be integrally prepared. Alternatively, the base layer and the pattern layer may be formed of different materials. For example, once a base layer has been prepared, a pattern layer may be formed thereon.

Specifically, examples of the material for the base layer include polyester resins, polyethersulfone resins, acrylic resins, polyetherimide resins, polyphenylene sulfide resins, polyarylate resins, polyimide resins, polycarbonate resins, cellulose triacetate resins, cellulose acetate propionate resins, and the like. More specifically, the material for the base layer may be a polyester resin, particularly, a polyethylene terephthalate resin or a polyethylene naphthalate resin.

In addition, the material for the pattern layer may be a UV-curable resin. Examples thereof include an acrylate resin such as an epoxy acrylate and a urethane acrylate, a methacrylate resin, and an epoxy resin.

Referring to FIG. 7a, the thickness (T1) of the base layer of the prism sheet may be 30 μM to 300 μM, specifically, 50 μM to 200 μM, and the thickness (T2) of the pattern layer may be 10 μM to 100 μM, specifically, 20 μM to 60 μM.

The optical composite sheet may comprise two or more prism sheets. Specifically, it may comprise a first prism sheet and a second prism sheet.

The first prism sheet and the second prism sheet may be the same as, or different from, each other in their patterns. For example, the prism sheet may comprise a first prism sheet comprising a first prism pattern extending in a first direction; and a second prism sheet comprising a second prism pattern extending in a second direction that intersects with the first direction.

Specifically, the first prism sheet and the second prism sheet may be perpendicular to each other in the grain directions of their patterns. More specifically, the first prism sheet may be a horizontal prism sheet, and the second prism sheet may be a vertical prism sheet, or vice versa.

In addition, the pattern layer of the first prism sheet and the pattern layer of the second prism sheet may both face the same direction or may face different directions.

Light Diffusion Layer

The light diffusion layer may conceal the pattern of a prism sheet or the like by diffusing light. The optical composite sheet may further comprise one, two, or more light diffusion layers.

Referring to FIGS. 3, 9a, and 9b, the light diffusion layer may comprise a first light diffusion layer (310) and a second light diffusion layer (320) each having beads (311, 321) and a binder resin (312, 322). The first light diffusion layer (310) and the second light diffusion layer (320) may be formed in the lower part and in the upper part of the optical sheet, respectively.

The beads may be an organic bead. The specific material may be one or more selected from the group consisting of an acrylate-based resin, a polystyrene resin, a nylon resin, and a silicone resin. More specifically, it may be a hard acrylate-based resin. Although the shape of the beads is not particularly limited, it may be, for example, a spherical shape. In addition, it is advantageous from the viewpoint of concealing power, luminance, and prevention of grinding with an adjacent layer that the beads have an average particle diameter of 5 μm to 20 μM. More specifically, it may be 0.5 μM to 10 μM or 0.8 μM to 6 μm. The binder resin may be at least one of a thermosetting resin and a photocurable resin.

The first light diffusion layer may have a haze of 60% to 99%, more specifically, a haze of 60% to 98%. When the haze is within the above preferred ranges, there is an advantage of high luminance with sufficient concealing power.

The second light diffusion layer may have a haze of 3% to 30%, more specifically, a haze of 7% to 17%. When the haze is within the above preferred ranges, there is an advantage of high luminance with sufficient grinding prevention performance.

Light Absorbing Layer

The light absorbing layer selectively absorbs light of a specific wavelength band.

The light absorbing layer may have a main absorption wavelength within the visible light wavelength band. However, the main absorption wavelength of the light absorbing layer may belong to a band excluding the pure RGB wavelength within a visible light wavelength band. Accordingly, the light absorbing layer may enhance a color gamut by blocking unnecessary wavelengths other than the pure RGB wavelength emitted from the light source. For example, the main absorption wavelength of the light absorbing layer may fall within 470 nm to 520 nm or 550 nm to 620 nm. Specifically, the main absorption wavelength of the light absorbing layer may fall within 480 nm to 510 nm, 560 nm to 610 nm, or 580 nm to 620 nm.

In addition, the light absorbing layer may further have a supplementary absorption wavelength having a lower absorption rate than that of the main absorption wavelength. The supplementary absorption wavelength may also fall within a visible light wavelength band. For example, the supplementary absorption wavelength may also belong to a band excluding the pure RGB wavelength within a visible light wavelength band. Alternatively, the supplementary absorption wavelength may belong to a pure RGB wavelength band unlike the main absorption wavelength. For example, the supplementary absorption wavelength may belong to 510 nm to 560 nm or 530 nm to 570 nm.

As a specific example, the light absorbing layer may have a main absorption wavelength within 580 nm to 620 nm and a supplementary absorption wavelength within 530 nm to 570 nm. Within the above ranges, the color gamut can be enhanced more effectively.

FIG. 8 is a cross-sectional view of a light absorbing layer employed in an optical composite sheet according to an embodiment. Referring to FIG. 8, the light absorbing layer (100) may comprise at least one light absorber (110) and a binder resin (120).

The light absorber may have a main absorption wavelength as exemplified above. For example, the light absorber may be a dye or a pigment and an organic material or an inorganic material. Specifically, it may be an organic dye or an inorganic pigment.

As a specific example, the light absorber may be at least one selected from the group consisting of pyrrolemethines, rhodamines, borondipyrromethenes, tetraazaporphyrins, squarines, and cyanines.

The total content of the at least one light absorber may be 0.01% by weight to 10% by weight, specifically 0.05% by weight to 7% by weight, based on the weight of the light absorbing layer.

The binder resin may be composed of a component suitable for coating or adhesion. For example, it may be one or more selected from the group consisting of a polyester resin, an acrylic resin, a polyurethane resin, a melamine resin, an epoxy resin, a silicone resin, a polyvinyl alcohol resin, and an oxazoline resin.

The light absorbing layer may further comprise a UV blocking agent. Examples of the UV blocking agent include hydroxybenzotriazole-based, tris-resorcinol-triazine chromophore-based, and hydroxyphenyl-benzotriazole chromophore-based. It may be used alone or in combination of two or more. The content of the UV blocking agent may be 0.01% by weight to 10% by weight, specifically 0.05% by weight to 7% by weight, based on the weight of the light absorbing layer.

The light absorbing layer may have a light transmittance of at least a certain level. For example, the light absorbing layer may have a light transmittance of 30% or more, 45% or more, 50% or more, or 70% or more, specifically, 30% to 90% or 50% to 90%, for a wavelength of 590 nm.

Base Film

The optical composite sheet according to an embodiment may further comprise a base film to be coated with the light diffusion layer. That is, the light diffusion layer may be coated on the base film.

The material of the base film may be, for example, a polyester resin, specifically, a polyethylene terephthalate resin.

Reflective Polarizing Film

The optical composite sheet according to an embodiment may comprise a reflective polarizing film to enhance luminance. For example, the reflective polarizing film may be disposed on the prism sheet.

The reflective polarizing film refers to a film that produces a desired optical effect by a plurality of thin films laminated therein. Examples thereof include a double brightness enhancement film (DBEF).

Specifically, the reflective polarizing film may comprise two or more types of thin films having different optical properties from each other in a laminated form.

As shown in FIG. 10, the reflective polarizing film may have a laminate (M) of a plurality of thin films between two skin layers (S). In such event, the different optical properties of the thin films may be refractive index or retardation.

As a specific example, the reflective polarizing film may be one in which a first resin layer and a second resin layer having different optical properties from each other are alternately laminated in 100 to 2,000 layers.

Cushioning Film

The optical composite sheet may further comprise a cushioning film to protect the skin layer of the reflective polarizing film. Specifically, as shown in FIG. 3, when the prism sheet (210) is disposed under the reflective polarizing film (400), the pattern of the prism sheet (210) may affect the thin film of the reflective polarizing film, thereby deteriorating its performance. Accordingly, a cushioning film (500) may be interposed between the reflective polarizing film (400) and the prism sheet (210) to prevent the deterioration in performance.

The material of the cushioning film may be, for example, a polyester resin, specifically, a polyethylene terephthalate resin.

Adhesive Layer

The optical composite sheet may comprise an adhesive layer between its constituent elements (prism sheet, base film, reflective polarizing film, cushioning film, and the like).

Commonly used thermosetting resins and UV-curable resins may be used as the material of the adhesive layer. For example, acrylic-based, urethane-based, epoxy-based, vinyl-based, polyester-based, polyamide-based resins, or mixtures thereof may be used. Examples of the acrylic-based resin include homopolymers having a methyl methacrylic, methacrylic, ethylacrylic, butylacrylic, arylacrylic, hexylacrylic, isopropylmethacrylic, benzylacrylic, vinylacrylic, or 2-methoxyethylacrylic resin as a repeat unit or copolymers having two or more of the above components.

Preferred examples of the material of the adhesive layer include (meth)acrylate resins, unsaturated polyester resins, polyester (meth)acrylate resins, silicone urethane (meth)acrylate resins, silicone polyester (meth)acrylate resins, fluorine urethane (meth)acrylate resins, and mixtures thereof.

Thickness of Each Layer of the Optical Composite Sheet

The thickness of each constitutional layer of the optical composite sheet described above may be adjusted within a certain range.

The thickness of the prism sheet may be 50 μM or more or 80 μM or more, and 300 μm or less or 200 μm or less.

The thickness of the light diffusion layer may be 3 μm or more or 5 μm or more, and 30 μm or less or 20 μm or less.

The thickness of the light absorbing layer may be 1 μm or more, 2 μm or more, or 3 μm or more, and 100 μM or less, 25 μM or less, 15 μm or less, 10 μm or less, or 5 μM or less.

The thickness of the base film may be 50 μM or more or 70 μM or more, and 200 μM or less or 150 μm or less.

The thickness of the reflective polarizing film may be 50 μm or more or 70 μm or more, and 200 μm or less or 150 μm or less.

The thickness of the cushioning film may be 50 μM or more or 70 μM or more, and 200 μM or less or 150 μm or less.

As a specific example, the reflective polarizing film may have a thickness of 50 inn to 200 μm, the cushioning film may have a thickness of 50 μm to 200 μm, the prism sheet may have a thickness of 50 μm to 350 μm, the light diffusion layer may have a thickness of 3 μm to 30 μm, and the light absorbing layer may have a thickness of 1 μm to 100 μM.

Lamination Configuration of the Optical Composite Sheet

The constitutional layers of the optical composite sheet (prism sheet, light diffusion layer, light absorbing layer, reflective polarizing film, cushioning film, and the like) described above may be disposed in an optical path.

In addition, the constitutional layers of the optical composite sheet may be combined with each other. The combination may be a direct combination or an indirect combination through an adhesive layer or the like. Accordingly, the optical composite sheet may comprise a laminate in which the constitutional layers are directly or indirectly combined.

As an example, the light absorbing layer may be combined with at least one of the prism sheet and the light diffusion layer. Specifically, the light absorbing layer may be disposed on one side of at least one of the prism sheet and the light diffusion layer.

As another example, the prism sheet, the light diffusion layer, and the light absorbing layer may be combined with each other. Specifically, the prism sheet comprises a base layer and a pattern layer formed on one side of the base layer, a light absorbing layer is disposed on the other side of the base layer, and the light diffusion layer may be disposed on the surface of the light absorbing layer.

As another example, the reflective polarizing film, the prism sheet, the light diffusion layer, and the light absorbing layer may be directly or indirectly combined with each other.

The optical composite sheet may comprise a reflective polarizing film, a prism sheet disposed under the reflective polarizing film; a light diffusion layer disposed under the prism sheet; and a light absorbing layer disposed on one side of any one of the reflective polarizing film, the prism sheet, and the light diffusion layer.

In addition, the optical composite sheet may further comprise a reflective polarizing film disposed on the prism sheet; and an additional light diffusion layer disposed on the reflective polarizing film, wherein the reflective polarizing film may comprise two or more thin films having different optical properties from each other in a laminated form.

In addition, the optical composite sheet may further comprise a cushioning film between the reflective polarizing film and the prism sheet, wherein the reflective polarizing film, the cushioning film, the prism sheet, the light diffusion layer, and the light absorbing layer may be directly or indirectly combined with each other.

In addition, the optical composite sheet may further comprise a cushioning film disposed on the prism sheet, a reflective polarizing film disposed on the cushioning film; and an additional light diffusion layer disposed on the reflective polarizing film, wherein the reflective polarizing film may comprise two or more thin films having different optical properties from each other in a laminated form, and the cushioning film may comprise a polyester resin.

The position of the light absorbing layer (in particular, the position thereof relative to other constitutional layers) within the optical composite sheet may be adjusted to enhance the optical performance.

For example, the light absorbing layer may be disposed at a rear side of the prism sheet with respect to the front side from which light incident on the optical composite sheet is emitted. Specifically, the prism sheet comprises a first prism sheet and a second prism sheet, wherein the light absorbing layer may be disposed at a rear side of the first prism sheet or the second prism sheet with respect to the front side from which incident light is emitted.

In addition, the light absorbing layer may be formed between the first prism sheet and the second prism sheet. As a specific example, the prism sheet may comprise a first prism sheet comprising a first prism pattern extending in a first direction; and a second prism sheet comprising a second prism pattern extending in a second direction that intersects with the first direction, wherein the second prism sheet may be disposed under the first prism sheet, and the light absorbing layer may be disposed between the first prism sheet and the second prism sheet.

In addition, the second prism sheet may be disposed at a rear side of the first prism sheet with respect to the front side, the second prism sheet may comprise a base layer and a pattern layer formed on one side of the base layer, and the light absorbing layer may be formed on the other side of the base layer. Here, the light diffusion layer may be formed on the surface of the light absorbing layer.

Referring to FIGS. 2 and 3, light incident on the bottom of the optical composite sheet (11) is emitted from the top thereof, and the light absorbing layer (100) may be disposed under the prism sheets (210, 220). According to this arrangement, since light incident from a light source passes through the light absorbing layer before it passes through the entire prism sheet, the color deviation according to the viewing angle can be minimized.

Specifically, the prism sheet, the light diffusion layer, and the light absorbing layer may be combined with each other, the light absorbing layer may be disposed closer to the light source than the prism sheet based on the light path, and the light diffusion layer may be disposed closer to the light source than the light absorbing layer with based on the light path.

More specifically, the prism sheet may comprise a first prism sheet comprising a first prism pattern extending in a first direction; and a second prism sheet comprising a second prism pattern extending in a second direction that intersects with the first direction, wherein the second prism sheet may be disposed under the first prism sheet, and the light absorbing layer may be disposed under the second prism sheet. In addition, the light diffusion layer may be formed under the light absorbing layer.

As a specific example, referring to FIG. 4a, a first light diffusion layer (310), a base film (350), a first prism sheet (210), a second prism sheet (220), a light absorbing layer (100), and a second light diffusion layer (320) may be sequentially laminated in the optical composite sheet (11), and an adhesive layer (620, 630) may be formed between them.

As another specific example, referring to FIG. 4b, a first light diffusion layer (310), a reflective polarizing film (400), a cushioning film (500), a first prism sheet (210), a second prism sheet (220), a light absorbing layer (100), and a second light diffusion layer (320) may be sequentially laminated in the optical composite sheet (11), and an adhesive layer (610, 620, 630) may be formed between them.

As still another specific example, referring to FIG. 5a, a first light diffusion layer (310), a base film (350), a first prism sheet (210), a light absorbing layer (100), a second prism sheet (220), and a second light diffusion layer (320) may be sequentially laminated in the optical composite sheet (11), and an adhesive layer (620, 630) may be formed between them.

As still another specific example, referring to FIG. 5b, a first light diffusion layer (310), a reflective polarizing film (400), a cushioning film (500), a first prism sheet (210), a light absorbing layer (100), a second prism sheet (220), and a second light diffusion layer (320) may be sequentially laminated in the optical composite sheet (11), and an adhesive layer (610, 620, 630) may be formed between them.

Color Gamut

A display device comprising the optical composite sheet according to an embodiment may be enhanced in color gamut as compared with the conventional one.

Color gamut refers to the gamut of color that each medium can reproduce in the entire gamut of light. In general, the evaluation of the color gamut of any medium is carried out by obtaining a triangle consisting of three RGB points in CIE (Commission Internationale de L'eclairage) chromaticity coordinates and comparing it with an RGB triangle of the NTSC (National Television System Committee) or DCI (Digital Cinema Initiatives) standard.

Chromaticity refers to the features of color excluding brightness, and CIE 1976 chromaticity coordinate u'v' is a method that can be expressed closest to the color perceived by humans.

In order to calculate the color gamut, a first color gamut is drawn as a reference within the entire gamut of chromaticity coordinates, and a second color gamut having the coordinates of red (R), green (G), and blue (B) measured from a sample as vertices is drawn. Then, the area of the overlapping color gamut between them is obtained. Thereafter, the color gamut of the sample can be measured by calculating the ratio between the areas of these gamuts.

For example, a triangle of the DCI color gamut (first color gamut) is drawn as a reference in the chromaticity coordinates (CIE 1931 chromaticity coordinates xy or CIE 1976 chromaticity coordinates u'v'), and a triangle of the color gamut (second color gamut) measured from a sample is drawn. Then, the DCI area ratio may be calculated as a percentage (%) of the area of the second color gamut to the area of the first color gamut. In addition, once the overlapping color gamut of the two color gamuts has been obtained, the DCI overlapping ratio may be calculated as a percentage (%) of the area of the overlapping color gamut to the area of the first color gamut.

For example, a display device comprising the optical composite sheet may have a DCI area ratio of 80% or more, specifically, 85% or more, 90% or more, or 95% or more, in the CIE 1931 chromaticity coordinates xy.

In addition, a display device comprising the optical composite sheet may have a DCI overlapping ratio of 80% or more, specifically, 85% or more, 90% or more, or 95% or more, in the CIE 1976 chromaticity coordinates u'v'.

As a specific example, a display device comprising the optical composite sheet may have a DCI area ratio of 90% or more in the CIE 1931 chromaticity coordinates xy and a DCI overlapping ratio of 90% or more in the CIE 1976 chromaticity coordinates u'v'.

Changes in Chromaticity Coordinate Values According to the Viewing Angle

In addition, a display device comprising the optical composite sheet according to an embodiment has little change in chromaticity coordinate values according to the viewing angle.

A display device comprising the optical composite sheet according to an embodiment has a $\Delta UV$ value of 0 to 0.012 according to the following equation:

$$\Delta UV = [(u'0 - u'60)^2 + (v'0 - v'60)^2]^{1/2}$$

In the above equation, the front u' value (u'0) is the u' value of the CIE 1976 chromaticity coordinates measured in a direction perpendicular to the plane direction of the prism sheet, the lateral u' value (u'60) is the u' value of the CIE 1976 chromaticity coordinates measured in the direction at an angle of 60° to the perpendicular direction, the front v' value (v'0) is the v' value of the CIE 1976 chromaticity coordinates measured in the perpendicular direction, and the lateral v' value (v'60) is the v' value of the CIE 1976 chromaticity coordinates measured in the 60° direction.

Chromaticity refers to the features of color excluding brightness, and CIE 1976 chromaticity coordinate u'v' is a method that can be expressed closest to the color perceived by humans.

ΔUV refers to a difference in chromaticity coordinate measured from the front and the lateral. The closer to 0, the less the difference in perceived color according to the viewing angle.

If ΔUV is 0.012 or less, the perceived color difference according to the viewing angle may hardly be acknowledged.

The lower limit of ΔUV may be 0, 0.001, 0.002, or 0.003, and the upper limit thereof may be 0.012, 0.011, 0.010, or 0.009. As a specific example, ΔUV may be 0 to 0.012, 0 to 0.011, 0.001 to 0.002 to 0.012, or 0.002 to 0.011.

Changes in Color Transmittance According to the Viewing Angle

A display device comprising the optical composite sheet according to an embodiment has little change in color according to the viewing angle. Referring to FIG. 1, when viewed from the front direction (V1) and the lateral direction (V2) at a specific angle (Va) thereto, the difference in color perceived on the screen can be minimized.

To this end, the optical composite sheet may have little change in color transmittance according to the viewing angle.

The color transmittance may be obtained through the following procedure. First, the optical composite sheet is disposed on a white surface light source having a continuous emission spectrum, and the spectral intensity (L1) of light emitted through the optical composite sheet is measured. Thereafter, a reference sheet is prepared by removing the light absorbing layer from the optical composite sheet, and the reference sheet is disposed on the surface light source. The spectral intensity (L0) of light emitted through the reference sheet is measured in the same manner and at the same position as in L1. The color transmittance is a value (L1/L0) obtained by dividing the spectral intensity (L1) of light emitted through the optical composite sheet by the spectral intensity (L0) of light emitted through the reference sheet.

The light source used for the surface light source may be the light source described above. In addition, the surface light source may comprise a light source and a light guide plate. The optical composite sheet and the reference sheet may be disposed on the upper side of the light guide plate, and the light source may be disposed on a lateral of the light guide plate.

In addition, the surface light source may be obtained from a large LCD TV. As an example, the surface light source may be one obtained by removing a liquid crystal display panel and various optical sheets other than a light guide plate from a large LCD TV. As another example, the surface light source may be one obtained by removing a prism sheet and a reflective polarizing film from the backlight unit of the LCD TV. As still another example, the surface light source may be one obtained by removing the display panel and the optical composite sheet from the display device according to the embodiment.

The optical composite sheet according to an embodiment satisfies the following Relationship (1):

$$0.5 \leq (TPeak\_0 - TPeak\_60)/(T450\_0 - T450\_60) \leq 1.5 \quad (1)$$

In Relationship (1), the front absorption peak (TPeak_0) is the lowest value among color transmittances measured in a direction perpendicular to the plane direction of the prism sheet, the lateral absorption peak (TPeak_60) is the lowest value among color transmittances measured in the direction at an angle of 60° to the perpendicular direction, the front blue transmittance (T450_0) is the color transmittance at a wavelength of 450 nm measured in the perpendicular direction, and the lateral blue transmittance (T450_60) is the color transmittance at a wavelength of 450 nm measured in the 60° direction In order to measure the color transmittance, a light source that emits white light with a continuous emission spectrum is prepared, a spectral intensity (L1) of light from the optical composite sheet is measured when light from the light source passes through the optical composite sheet, a reference sheet is prepared by removing the light absorbing layer from the optical composite sheet, a spectral intensity (L0) of light from the optical composite sheet is measured when light from the light source passes through the reference sheet, and the color transmittance is a value obtained by dividing L1 by L0.

The spectral intensity is one in which the intensity of light passing through the optical composite sheet is measured for each wavelength. For example, it may be a spectral radiance (unit: $W \cdot sr^{-1} \cdot m^{-2} \cdot nm^{-1}$) measured using a spectroradiometer for the light incident on the rear side of the optical composite sheet from a light source and emitted from the front side.

Thus, the color transmittance refers to the ratio of spectral intensities generated by the presence or absence of the light absorbing layer under the same conditions. It may be interpreted similarly to the spectral transmittance of the light absorbing layer (or an optical composite sheet having the same).

From this point of view, the main absorption wavelength may be the same as the wavelength of the lowest color transmittance (i.e., the peak of the deepest valley shape) in a color transmittance curve (FIGS. 11b and 12b).

In addition, the value of (TPeak_0-TPeak_60) may be interpreted as the difference in spectral transmittance at the main absorption wavelength measured at the front side and at an angle of 60°. The value of (T450_0-T450_60) may be interpreted as the difference in spectral transmittance at a wavelength of 450 nm measured at the front side and at an angle of 60°.

In order for the color of the light passing through the optical composite sheet to be perceived to be the same regardless of the measurement angle, the difference in spectral transmittance with respect to wavelength should be approximately the same, for example, the ratio of (TPeak_0-TPeak_60)/(T450_0-T450_60) should be close to 1.

If the ratio value is less than 0.5 or greater than 1.5, the difference value in spectral transmittance varies greatly depending on the viewing angle. Thus, the color formed by combining light with respect to wavelength is perceived differently.

The lower limit of Relationship (1) is 0.5 and may be, for example, 0.7, 0.8, 1.0, 1.2, or 1.3. In addition, the upper limit of Relationship (1) is 1.5 and may be, for example, 0.3, 1.2, 1.0, 0.8, or 0.7. As a specific example, the value of Relationship (1) may be 0.5 to 1.2, 0.5 to 1.0, 0.5 to 0.8, 0.8 to 1.5, 1.0 to 1.5, 1.2 to 1.5, 0.7 to 1.3, or 0.8 to 1.2.

In particular, in the curve of the spectral intensity of light passing through the optical composite sheet (see FIGS. 11a and 12a), the intensity of the wavelength of about 450 nm is the highest, while the intensity of the main absorption wavelength is the lowest. Thus, according to Relationship (1), the change in color can be more accurately calculated by considering the difference in color transmittance at two wavelengths having a large difference in spectral intensity.

In addition, in the curve of the spectral intensity of light passing through the optical composite sheet (see FIGS. 11a and 12a), the difference in color transmittance with the wavelength of about 530 nm, which is the second highest intensity following the wavelength of 450 nm, may be further considered. For example, the optical composite sheet may satisfy the following Relationship (2):

$$0.5 \leq (TPeak\_0 - TPeak\_60)/(T530\_0 - T530\_60) \leq 1.5 \quad (2)$$

In Relationship (2), the front absorption peak (TPeak_0) is the lowest value among color transmittances measured in a direction perpendicular to the plane direction of the prism sheet, the lateral absorption peak (TPeak_60) is the lowest value among color transmittances measured in the direction at an angle of 60° to the perpendicular direction, the front green transmittance (T530_0) is the color transmittance at a wavelength of 530 nm measured in the perpendicular direction, and the lateral green transmittance (T530_60) is the color transmittance at a wavelength of 530 nm measured in the 60° direction In order to measure the color transmittance, a light source that emits white light with a continuous emission spectrum is prepared, a spectral intensity (L1) of light from the optical composite sheet is measured when light from the light source passes through the optical composite sheet, a reference sheet is prepared by removing the light absorbing layer from the optical composite sheet, a spectral intensity (L0) of light from the optical composite sheet is measured when light from the light source passes through the reference sheet, and the color transmittance is a value obtained by dividing L1 by L0.

In the optical composite sheet according to the embodiment, optical functional elements such as a prism sheet and a light diffusion layer are combined, and a light absorbing layer that selectively absorbs light of a specific wavelength band is inserted, so that the optical performance and color gamut can be enhanced as compared with the prior art. In particular, the color transmittance of the optical composite sheet with respect to wavelength measured for each viewing angle satisfies a specific relationship, whereby it is possible to effectively reduce the color deviation with respect to the viewing angle.

Accordingly, the optical composite sheet according to the embodiment may be applied to a backlight unit of a display device such as an LCD to enhance its performance.

MODE FOR THE INVENTION

Hereinafter, the embodiments are explained in more detail by the following examples. However, the scope of the present invention is not limited thereto only.

Preparation Example of Optical Composite Sheets

Example 1-1

(A) In order to prepare a composition for a light absorbing layer, 0.05 part by weight of a light absorber (PANAX NEC 584, Ukseung Chemical) and 1.0 part by weight of a UV blocking agent (TINUVIN'928, BASF) were added to 100 parts by weight of a solution in which an acrylic binder resin (AOF-2914, Aekyung) and propylene glycol methyl ether (PGME) had been mixed at a weight ratio of 30:70.

(B) A UV-curable resin was coated on one side of a base film (PET) having a thickness of 100 μM to form a prism pattern in a thickness of about 40 μM, thereby preparing a lower prism sheet. The composition for a light absorbing layer was coated on the other side of the base film using a Mayer bar, which was dried and cured to form a light absorbing layer having a thickness of 3 μm. A composition was prepared in which 15 parts by weight of polybutyl methacrylate (PBMA) beads, 35 parts by weight of a urethane acrylate resin, and 50 parts by weight of methyl ethyl ketone (MEK) as a solvent were mixed. It was coated on the surface of the light absorbing layer and dried to form a lower light diffusion layer having a thickness of 5 μm.

(C) A UV-curable resin was coated on one side of a base film (PET) having a thickness of 100 μM to form a prism pattern in a thickness of about 40 μM, thereby preparing an upper prism sheet. A UV-curable adhesive resin was coated on the other side of the base film using a Mayer bar to a thickness of 0.5 to 1.0 μm. It adhered to the lower prism sheet previously prepared and UV cured to obtain a composite sheet.

(D) A composition was prepared in which 15 parts by weight of polymethyl methacrylate (PMMA) beads, 35 parts by weight of an acryl binder resin, and 50 parts by weight of methyl ethyl ketone (MEK) as a solvent were mixed. This composition was coated on one side of a base film (PET) having a thickness of 100 μm and dried to form an upper light diffusion layer having a thickness of 15 μm. A UV-curable adhesive resin was coated on the other side of the base film using a Mayer bar to a thickness of 0.5 to 1.0 μm. It adhered to the upper prism pattern of the composite sheet previously prepared and UV cured to obtain a final optical composite sheet (see FIG. 4a).

Example 1-2

The procedures of Example 1-1 were repeated to obtain a final optical composite sheet, provided that a light absorbing layer was not formed on the other side of the base film of the lower prism sheet in step (B); instead, a light absorbing layer was formed on the other side of the upper prism sheet in step (C), and an adhesive resin was coated on the surface of the light absorbing layer, which adhered to the lower prism sheet (see FIG. 5a).

Comparative Example 1

The procedures of Example 1-1 were repeated to obtain a final optical composite sheet, provided that a light absorbing layer was not formed on the other side of the base film of the lower prism sheet in step (B); instead, a light absorbing layer was formed on one side of the base film in step (D), and an upper diffusion layer was formed thereon (see FIG. 6a).

Reference Example 1

The procedures of Example 1-1 were repeated to obtain a final optical composite sheet, except that a light absorbing layer was not formed on the other side of the base film of the lower prism sheet in step (B).

Example 2-1

The procedures of steps (A) to (C) of Example 1-1 were repeated to obtain a composite sheet.

(D) A UV-curable adhesive resin was coated on one side of a cushioning film (PET) having a thickness of 100 μm using a Mayer bar to a thickness of 0.5 to 1.0 μm. It adhered to the composite sheet previously prepared and UV cured.

(E) A composition was prepared in which 15 parts by weight of polymethyl methacrylate (PMMA) beads, 35 parts by weight of an acryl binder resin, and 50 parts by weight of methyl ethyl ketone (MEK) as a solvent were mixed. This composition was coated on one side of a double brightness enhancement film (DBEF, Qv2, 3M) having a thickness of 95 μm and dried to form an upper light diffusion layer having a thickness of 10 μm. A UV-curable adhesive resin was coated on the other side of the double brightness enhancement film using a Mayer bar to a thickness of 10 μm. It adhered to the cushioning film of the composite sheet prepared in the above step (D) and UV cured to obtain a final optical composite sheet (see FIG. 4b).

Example 2-2

The procedures of Example 2-1 were repeated to obtain a final optical composite sheet, provided that a light absorbing layer was not formed on the other side of the base film of the lower prism sheet in step (B); instead, a light absorbing layer was formed on the other side of the upper prism sheet in step (C), and an adhesive resin was coated on the surface of the light absorbing layer, which adhered to the lower prism sheet (see FIG. 5b).

Comparative Example 2

The procedures of Example 2-1 were repeated to obtain a final optical composite sheet, provided that a light absorbing layer was not formed on the other side of the base film of the lower prism sheet in step (B); instead, a light absorbing layer was formed on one side of the double brightness enhancement film in step (E), and an upper diffusion layer was formed thereon (see FIG. 6b).

front direction was a direction perpendicular to the plane direction of the display device, more specifically, a direction perpendicular to the plane direction of the optical composite sheet. The lateral direction was a direction having a difference of 60° angle with respect to the perpendicular direction. Thereafter, ΔUV was calculated according to the following equation and shown in the table below.

$$\Delta UV \text{ at a viewing angle of } 60° = [(u'0-u'60)^2 + (v'0-v'60)^2]^{1/2}$$

In the above equation, the front u' value (u'0) is the u' value of the CIE 1976 chromaticity coordinates measured in a direction perpendicular to the plane direction of the prism sheet, the lateral u' value (u'60) is the u' value of the CIE 1976 chromaticity coordinates measured in the direction at an angle of 60° to the perpendicular direction, the front v' value (v'0) is the v' value of the CIE 1976 chromaticity coordinates measured in the perpendicular direction, and the lateral v' value (v'60) is the v' value of the CIE 1976 chromaticity coordinates measured in the 60° direction.

In addition, the color was observed in the front direction and in the −60° direction in the same manner as above, and ΔUV at a viewing angle of −60° was calculated and shown in the table below.

Light Transmittance of a Light Absorbing Layer

The procedures of Step (a) of Example 1 were repeated to prepare a composition for a light absorbing layer, which was coated on one side of a PET film having a thickness of 100 μm, dried, and cured to form a light absorbing layer having a thickness of 3 μm. The transmittance for light of a wavelength of 590 nm was measured using a spectrophotometer. The results are shown in the table below.

TABLE 1

|  | C. Ex. 1 | Ex. 1-1 | Ex. 1-2 | C. Ex. 2 | Ex. 2-1 | Ex. 2-2 |
| --- | --- | --- | --- | --- | --- | --- |
| Color x | 0.2653 | 0.2512 | 0.2586 | 0.2644 | 0.2492 | 0.2581 |
| Color y | 0.2730 | 0.2538 | 0.2667 | 0.2728 | 0.2524 | 0.2649 |
| Area ratio | 90.8% | 99.1% | 94.3% | 90.8% | 99.0% | 94.1% |
| DCI overlapping ratio | 91.8% | 95.3% | 94.0% | 91.8% | 95.2% | 93.9% |
| ΔUV at a viewing angle of 60° | 0.0168 | 0.0042 | 0.0099 | 0.0198 | 0.0059 | 0.0102 |
| ΔUV at a viewing angle of −60° | 0.0154 | 0.0029 | 0.0083 | 0.0135 | 0.0023 | 0.0079 |
| Light transmittance of light absorbing layer | 72.0% | 72.0% | 72.0% | 72.0% | 72.0% | 72.0% |

Application Example to a Display Device

In a liquid crystal display device (55-inch LED direct type, 220 V, LG Electronics), the optical films (reflective polarizing film and prism sheet) located on the rear side of the liquid crystal display panel were removed, and the optical composite sheet instead was placed there.

Measurement Example of Color Gamut

The optical composite sheet was applied to a display device. A spectroradiometer (SR-3, TOPCON, working distance: 660 mm, field spec.: 0.2 D) was used to measure CIE 1931 chromaticity coordinates xy, from which the area of color gamut and DCI overlapping ratio were calculated. The results are shown in the table below.

Differences in Color According to Observation Angle

The optical composite sheet was applied to a display device, and the color was observed in the front direction and the lateral direction, respectively, to calculate the difference. Specifically, referring to FIG. 1, the color (CIE 1976 chromaticity coordinates u'v') was observed in the front direction (V1) and the lateral direction (V2). Here, the angle (Va) between the two directions was set to 60°. Specifically, the As can be seen from the above table, the display devices to which the optical composite sheet according to the embodiment had been applied were significantly enhanced in color gamut as compared with the comparative examples and had very little change in chromaticity coordinates according to the viewing angle.

Differences in Color Transmittance According to Observation Angle

The optical composite sheet of Example 1-1 was disposed on a surface light source using white LEDs (GaN, YAG) having a continuous emission spectrum. The spectral intensity of light emitted through the optical composite sheet was measured in the front direction and the lateral direction. Here, the angle between the two directions was set to 60°. Specifically, the front direction was a direction perpendicular to the plane direction of the optical composite sheet, more specifically, a direction perpendicular to the plane direction of the prism sheet in the optical composite sheet. The lateral direction was a direction having a difference of 60° angle with respect to the perpendicular direction. In addition, the spectral intensity was also measured for the optical composite sheet of Reference Example 1 for each measurement angle under the same conditions.

The optical composite sheet of Example 1-1 and the optical composite sheet of Reference Example 1 were each placed on the surface light source, and spectral intensities measured in the front and lateral (60°) directions are shown in FIG. 11a. Thereafter, the spectral intensity (L1) of the optical composite sheet of Example 1-1 was divided by the spectral intensity (L0) of the optical composite sheet of Reference Example 1 to produce a color transmittance (L1/L0). FIG. 11b shows the color transmittance of the optical composite sheet of Example 1-1 measured in the front and lateral (60°) directions.

In addition, in the same manner as above, the optical composite sheet of Comparative Example 1 and the optical composite sheet of Reference Example 1 were each placed on the surface light source, and spectral intensities measured in the front and lateral (60°) directions are shown in FIG. 12a. FIG. 12b shows the color transmittance of the optical composite sheet of Comparative Example 1 measured in the front and lateral (60°) directions.

It was confirmed whether the respective optical composite sheets satisfied the following Equation (1) from the color transmittance curves of FIGS. 11b and 12b.

$$0.5 \leq (TPeak\_0 - TPeak\_60)/(T450\_0 - T450\_60) \leq 1.5 \quad (1)$$

In Relationship (1), the front absorption peak (TPeak_0) is the lowest value among color transmittances measured in a direction perpendicular to the plane direction of the prism sheet, the lateral absorption peak (TPeak_60) is the lowest value among color transmittances measured in the direction at an angle of 60° to the perpendicular direction, the front blue transmittance (T450_0) is the color transmittance at a wavelength of 450 nm measured in the perpendicular direction, and the lateral blue transmittance (T450_60) is the color transmittance at a wavelength of 450 nm measured in the 60° direction In order to measure the color transmittance, a light source that emits white light with a continuous emission spectrum is prepared, a spectral intensity (L1) of light from the optical composite sheet is measured when light from the light source passes through the optical composite sheet, a reference sheet is prepared by removing the light absorbing layer from the optical composite sheet, a spectral intensity (L0) of light from the optical composite sheet is measured when light from the light source passes through the reference sheet, and the color transmittance is a value obtained by dividing L1 by L0.

In addition, in the same manner as above, the values of (TPeak_0-TPeak_60)/(T530_0-T530_60) for the optical composite sheets of Example 1-1 and Comparative Example 1 were calculated and shown in the following table. The front green transmittance (T530_0) is the color transmittance at a wavelength of 530 nm measured in the perpendicular direction, and the lateral green transmittance (T530_60) is the color transmittance at a wavelength of 530 nm measured in the 60° direction.

TABLE 2

| | T450_0 | T450_60 | TPeak_0 | TPeak_60 | (TPeak_0-TPeak_60)/(T450_0-T450_60) |
|---|---|---|---|---|---|
| Ex. 1-1 | 0.99 | 0.90 | 0.47 | 0.35 | 1.33 |
| C. Ex. 1 | 0.98 | 0.96 | 0.48 | 0.36 | 6.00 |

TABLE 3

| | T530_0 | T530_60 | TPeak_0 | TPeak_60 | (TPeak_0-TPeak_60)/(T530_0-T530_60) |
|---|---|---|---|---|---|
| Ex. 1-1 | 0.80 | 0.91 | 0.47 | 0.35 | 1.10 |
| C. Ex. 1 | 0.90 | 0.93 | 0.48 | 0.36 | 4.00 |

As shown in the above table and FIGS. 11a and 11b, the difference value in spectral transmittance with respect to wavelength was almost the same in Example 1-1. Thus, even if the viewing angle of the display device varies, the color of the screen can be perceived the same. In contrast, the difference value in spectral transmittance varies greatly depending on the viewing angle in Comparative Example 1. Thus, there arises a problem in that the color formed by combining light with respect to wavelength is perceived differently.

The invention claimed is:

1. An optical composite sheet, which comprises:
   a prism sheet;
   a light diffusion layer disposed under the prism sheet; and
   a light absorbing layer disposed on the prism sheet, between the prism sheet and the light diffusion layer, or under the light diffusion layer,
   wherein the following Relationship (1) is satisfied:

$$0.5 \leq (TPeak\_0 - TPeak\_60)/(T450\_0 - T450\_60) \leq 1.5 \quad (1)$$

in Relationship (1),
   TPeak_0 (front absorption peak) is lowest value among color transmittances measured in a direction perpendicular to a plane direction of the prism sheet,
   TPeak_60 (lateral absorption peak) is lowest value among color transmittances measured in a direction at an angle of 60° to the perpendicular direction,
   T450_0 (front blue transmittance) is color transmittance at a wavelength of 450 nm measured in the perpendicular direction, and
   T450_60 (lateral blue transmittance) is color transmittance at a wavelength of 450 nm measured in the 60° direction;
   in order to measure the color transmittance of the front blue transmittance and the color transmittance of the lateral blue transmittance, a light source that emits white light with a continuous emission spectrum is prepared, a spectral intensity (L1) of light from the optical composite sheet is measured when light from the light source passes through the optical composite sheet, a reference sheet is prepared by removing the light absorbing layer from the optical composite sheet, a spectral intensity (L0) of light from the optical composite sheet is measured when light from the light source passes through the reference sheet, and the color transmittance of the front blue transmittance and the color transmittance of the lateral blue transmittance are each a value obtained by dividing L1 by L0.

2. The optical composite sheet of claim 1, wherein the prism sheet comprises a first prism sheet comprising a first prism pattern extending in a first direction; and a second prism sheet comprising a second prism pattern extending in a second direction that intersects with the first direction, wherein the second prism sheet is disposed under the first prism sheet, and the light absorbing layer is interposed between the first prism sheet and the second prism sheet.

3. The optical composite sheet of claim 1, wherein the prism sheet comprises a first prism sheet comprising a first prism pattern extending in a first direction; and a second prism sheet comprising a second prism pattern extending in a second direction that intersects with the first direction, wherein the second prism sheet is disposed under the first prism sheet, and the light absorbing layer is disposed under the second prism sheet.

4. The optical composite sheet of claim 3, wherein the light diffusion layer is disposed under the light absorbing layer.

5. The optical composite sheet of claim 1, which further comprises a reflective polarizing film disposed on the prism sheet; and an additional light diffusion layer disposed on the reflective polarizing film, wherein the reflective polarizing film comprises two or more thin films having different optical properties from each other in a laminated form.

6. The optical composite sheet of claim 1, wherein the light absorbing layer comprises at least one light absorber and a binder resin and has a main absorption wavelength at 580 nm to 620 nm and a supplementary absorption wavelength at 530 nm to 570 nm.

7. The optical composite sheet of claim 1, which further satisfies the following Relationship (2):

$$0.5 \leq (TPeak\_0 - TPeak\_60)/(T530\_0 - T530\_60) \leq 1.5 \quad (2)$$

in Relationship (2),

T530_0 (front green transmittance) is color transmittance at a wavelength of 530 nm measured in the perpendicular direction, and T530_60 (lateral green transmittance) is color transmittance at a wavelength of 530 nm measured in the 60° direction, in order to measure the color transmittance of the front green transmittance and the color transmittance of the lateral green transmittance, a light source that emits white light with a continuous emission spectrum is prepared, a spectral intensity (L1) of light from the optical composite sheet is measured when light from the light source passes through the optical composite sheet, a reference sheet is prepared by removing the light absorbing layer from the optical composite sheet, a spectral intensity (L0) of light from the optical composite sheet is measured when light from the light source passes through the reference sheet, and the color transmittance of the front green transmittance and the color transmittance of the lateral green transmittance are a value obtained by dividing L1 by L0.

8. The optical composite sheet of claim 1, which further comprises a cushioning film disposed on the prism sheet, a reflective polarizing film disposed on the cushioning film; and an additional light diffusion layer disposed on the reflective polarizing film, wherein the reflective polarizing film comprises two or more thin films having different optical properties from each other in a laminated form, and the cushioning film comprises a polyester resin.

9. A display device, which comprises:

a light source;

an optical composite sheet into which light from the light source is incident; and a display panel into which light from the optical composite sheet is incident, wherein the optical composite sheet comprises a prism sheet; a light diffusion layer disposed under the prism sheet; and a light absorbing layer disposed on the prism sheet, between the prism sheet and the light diffusion layer, or under the light diffusion layer, and the following Relationship (1) is satisfied:

$$0.5 \leq (TPeak\_0 - TPeak\_60)/(T450\_0 - T450\_60) \leq 1.5 \quad (1)$$

in Relationship (1),

TPeak_0 (front absorption peak) is lowest value among color transmittances measured in a direction perpendicular to a plane direction of the prism sheet, TPeak_60 (lateral absorption peak) is lowest value among color transmittances measured in a direction at an angle of 60° to the perpendicular direction, T450_0 (front blue transmittance) is color transmittance at a wavelength of 450 nm measured in the perpendicular direction, and T450_60 (lateral blue transmittance) is color transmittance at a wavelength of 450 nm measured in the 60° direction;

in order to measure the color transmittance of the front blue transmittance and the color transmittance of the lateral blue transmittance, a light source that emits white light with a continuous emission spectrum is prepared, a spectral intensity (L1) of light from the optical composite sheet is measured when light from the light source passes through the optical composite sheet, a reference sheet is prepared by removing the light absorbing layer from the optical composite sheet, a spectral intensity (L0) of light from the optical composite sheet is measured when light from the light source passes through the reference sheet, and the color transmittance of the front blue transmittance and the color transmittance of the lateral blue transmittance are each a value obtained by dividing L1 by L0.

10. The display device of claim 9, wherein the display device has a $\Delta UV$ value of 0 to 0.012 according to the following equation:

$$\Delta UV = [(u'0 - u'60)^2 + (v'0 - v'60)^2]^{1/2}$$

in the above equation, the front u' value (u'0) is the u' value of the CIE 1976 chromaticity coordinates measured in a direction perpendicular to the plane direction of the prism sheet, the lateral u' value (u'60) is the u' value of the CIE 1976 chromaticity coordinates measured in the direction at an angle of 60° to the perpendicular direction, the front v' value (v'0) is the v' value of the CIE 1976 chromaticity coordinates measured in the perpendicular direction, and the lateral v' value (v'60) is the v' value of the CIE 1976 chromaticity coordinates measured in the 60° direction.

\* \* \* \* \*